United States Patent
Shoya et al.

(10) Patent No.: US 8,284,424 B2
(45) Date of Patent: Oct. 9, 2012

(54) WORK INFORMATION GENERATION SYSTEM

(75) Inventors: Tomoyuki Shoya, Kanagawa (JP);
Minoru Koshimizu, Kanagawa (JP);
Yoshitsugu Hirose, Kanagawa (JP);
Toshiroh Shimada, Kanagawa (JP);
Shigehiko Sasaki, Kanagawa (JP);
Kiwame Tokai, Kanagawa (JP);
Hiroyuki Hattori, Kanagawa (JP);
Hiroshi Ishikawa, Kanagawa (JP); Sho Hasegawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1013 days.

(21) Appl. No.: 11/492,000

(22) Filed: Jul. 25, 2006

(65) Prior Publication Data

US 2007/0171462 A1    Jul. 26, 2007

(30) Foreign Application Priority Data

Jan. 24, 2006 (JP) ................................ 2006-015032

(51) Int. Cl.
*G06K 15/02* (2006.01)
*G06F 3/00* (2006.01)
*G06F 3/048* (2006.01)
*G06F 3/12* (2006.01)

(52) U.S. Cl. ........ 358/1.15; 358/1.2; 715/753; 715/755; 715/757

(58) Field of Classification Search .................... 707/10, 707/8, 100, 200, 204; 709/223, 226, 203; 715/751, 200; 1/1; 358/1.9, 1.15; 705/7.19, 705/59, 3; 455/25
See application file for complete search history.

(56) References Cited

U.S. PATENT DOCUMENTS

| | | | | |
|---|---|---|---|---|
| 6,098,128 | A * | 8/2000 | Velez-McCaskey et al. | 710/65 |
| 6,119,117 | A * | 9/2000 | Yoda et al. | 707/10 |
| 6,185,563 | B1 * | 2/2001 | Hino | 1/1 |
| 6,363,352 | B1 * | 3/2002 | Dailey et al. | 705/7.19 |
| 6,400,265 | B1 * | 6/2002 | Saylor et al. | 340/531 |
| 6,564,261 | B1 | 5/2003 | Gudjonsson et al. | |
| 6,591,300 | B1 * | 7/2003 | Yurkovic | 709/226 |
| 6,629,129 | B1 * | 9/2003 | Bookspan et al. | 709/204 |
| 6,792,427 | B2 * | 9/2004 | Jackson | 707/694 |
| 6,990,631 | B2 * | 1/2006 | Narahara | 715/246 |
| 7,046,396 | B2 * | 5/2006 | Chan | 358/1.9 |
| 7,194,490 | B2 * | 3/2007 | Zee | 707/204 |
| 7,194,505 | B2 * | 3/2007 | Yano et al. | 709/203 |
| 7,359,076 | B2 * | 4/2008 | Uchino | 358/1.15 |

(Continued)

FOREIGN PATENT DOCUMENTS

JP    A 07-121529    5/1995

(Continued)

OTHER PUBLICATIONS

Mar. 15, 2011 Office Action issued in Japanese Patent Application No. JP-2006-015032 (w/English language translation).

(Continued)

*Primary Examiner* — Akwasi M Sarpong
(74) *Attorney, Agent, or Firm* — Oliff & Berridge, PLC

(57) ABSTRACT

A work information generation system includes: a plurality of terminals that display a document; and a server that conducts communications with the plurality of terminals, wherein each of the plurality of terminals includes a notification section that sends notification of identification information given to each of the plurality of terminals and identification information of a document in association with each other to the server in response to display of the document, and wherein the server includes: a determination section; a work information generation section; and a work information retention section as described in the specification.

28 Claims, 6 Drawing Sheets

U.S. PATENT DOCUMENTS

| | | | |
|---|---|---|---|
| 7,516,410 B2 * | 4/2009 | Thompson et al. | 715/753 |
| 7,627,827 B2 * | 12/2009 | Taylor et al. | 715/751 |
| 7,643,794 B2 * | 1/2010 | Ofek et al. | 455/25 |
| 7,725,331 B2 * | 5/2010 | Schurenberg et al. | 705/3 |
| 2002/0055891 A1 | 5/2002 | Yang | |
| 2002/0059406 A1 * | 5/2002 | Tanaka et al. | 709/223 |
| 2005/0102238 A1 * | 5/2005 | Schull | 705/59 |
| 2005/0183011 A1 * | 8/2005 | Keohane et al. | 715/539 |
| 2007/0050452 A1 * | 3/2007 | Raju | 709/204 |
| 2007/0100939 A1 * | 5/2007 | Bagley et al. | 709/204 |

FOREIGN PATENT DOCUMENTS

| | | |
|---|---|---|
| JP | A-2001-197464 | 7/2001 |
| JP | A-2001-350787 | 12/2001 |
| JP | A-2002-109391 | 4/2002 |
| JP | A-2002-544608 | 12/2002 |
| JP | A-2003-18303 | 1/2003 |
| JP | A 2004-106495 | 4/2004 |
| JP | A-2004-118238 | 4/2004 |
| JP | A-2004-259161 | 9/2004 |
| JP | A-2006-011716 | 1/2006 |

OTHER PUBLICATIONS

Office Action issued on Aug. 23, 2011 in corresponding Japanese Patent Application No. 2006-015032. (with English language translation).

* cited by examiner

FIG. 5

| WORK IDENTIFICATION INFORMATION | USER IDENTIFICATION INFORMATION | DOCUMENT IDENTIFICATION INFORMATION | TIME INFORMATION | DOCUMENT MANIPULATION INFORMATION | LOCATION INFORMATION |
|---|---|---|---|---|---|
| --- | --- | --- | --- | --- | --- |

FIG. 6

| SCHEDULE IDENTIFICATION INFORMATION | TIME INFORMATION | JOB INFORMATION | | |
|---|---|---|---|---|
| | | USER IDENTIFICATION INFORMATION | LOCATION INFORMATION | ------- |
| --- | --- | --- | --- | --- |

# WORK INFORMATION GENERATION SYSTEM

BACKGROUND

1. Technical Field

This invention relates to an art of automatically generating work information indicating that the same document was displayed on a plurality of terminals under a predetermined condition.

2. Related Art

In recent years, a conference system for collecting information concerning a conference conducted in an electronically provided virtual conference space has been designed.

For example, a virtual conference space is provided based on the conference schedule of the preset conference time, participating members, etc., and conference information of document distribution, etc., by each member in the conference held as each member accesses the virtual conference space is collected for making the most of the history information for later work, etc.

SUMMARY

According to an aspect of the invention, there is provided a work information generation system including:

a plurality of terminals that display a document; and a server that conducts communications with the plurality of terminals, wherein each of the plurality of terminals comprises a notification section that sends notification of identification information given to each of the plurality of terminals and identification information of a document in association with each other to the server in response to display of the document, and wherein the server comprises:

a determination section that determines that the same document is displayed satisfying a predetermined condition at the plurality of terminals based on the notification received from each of the plurality of terminals;

a work information generation section that generates work information containing the identification information of the document, the identification information given to each of the plurality of terminals displaying the document and information relating to the predetermined condition in association with each other in response to determining that the same document is displayed satisfying the predetermined condition at the plurality of terminals; and a work information retention section that records and retains the generated work information.

BRIEF DESCRIPTION OF THE DRAWINGS

Embodiment(s) of the present invention will be described in detail based on the following figures, wherein:

FIG. 5 is a drawing to describe work information according to an exemplary embodiment of the invention;

FIG. 6 is a drawing to describe schedule information according to an exemplary embodiment of the invention;

DETAILED DESCRIPTION

The invention will be discussed specifically based on an exemplary embodiment.

Figure 1:
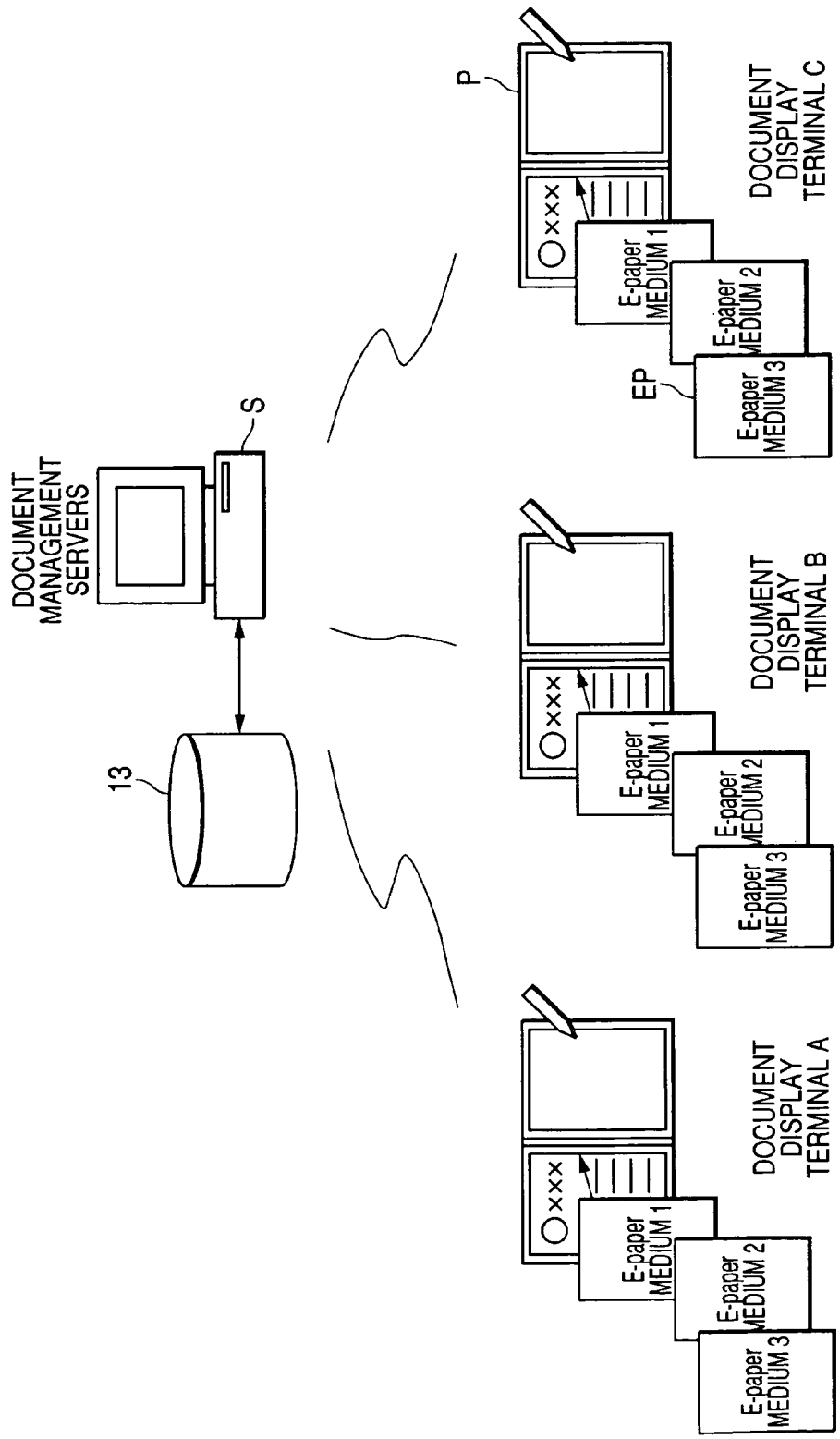
FIG. 1 is a drawing to show the configuration of a work information generation system according to an exemplary embodiment of the invention.

FIG. 1 shows a general configuration example of a work information generation system according to one exemplary embodiment of the invention.

The system of the exemplary embodiment is made up of a document management server S including a document management DB 13 for managing documents and a plurality of document display terminals for conducting information communications with the document management server S.

The document display terminal is a terminal of a combination of paper-like flexible thin electronic paper EP capable of holding display of an image in a no-power supply state and an electronic paper printer P for writing a document image to the electronic paper EP for display in one. The document display terminal enables the user to connect a plurality of sheets of electronic paper EP detachably like a binder; for example, the document display terminal enables the user to detach electronic paper EP to which an electronic document is written and pass it to another user or attach electronic paper EP received from another user to the document display terminal for sharing the documents.

Figure 2:
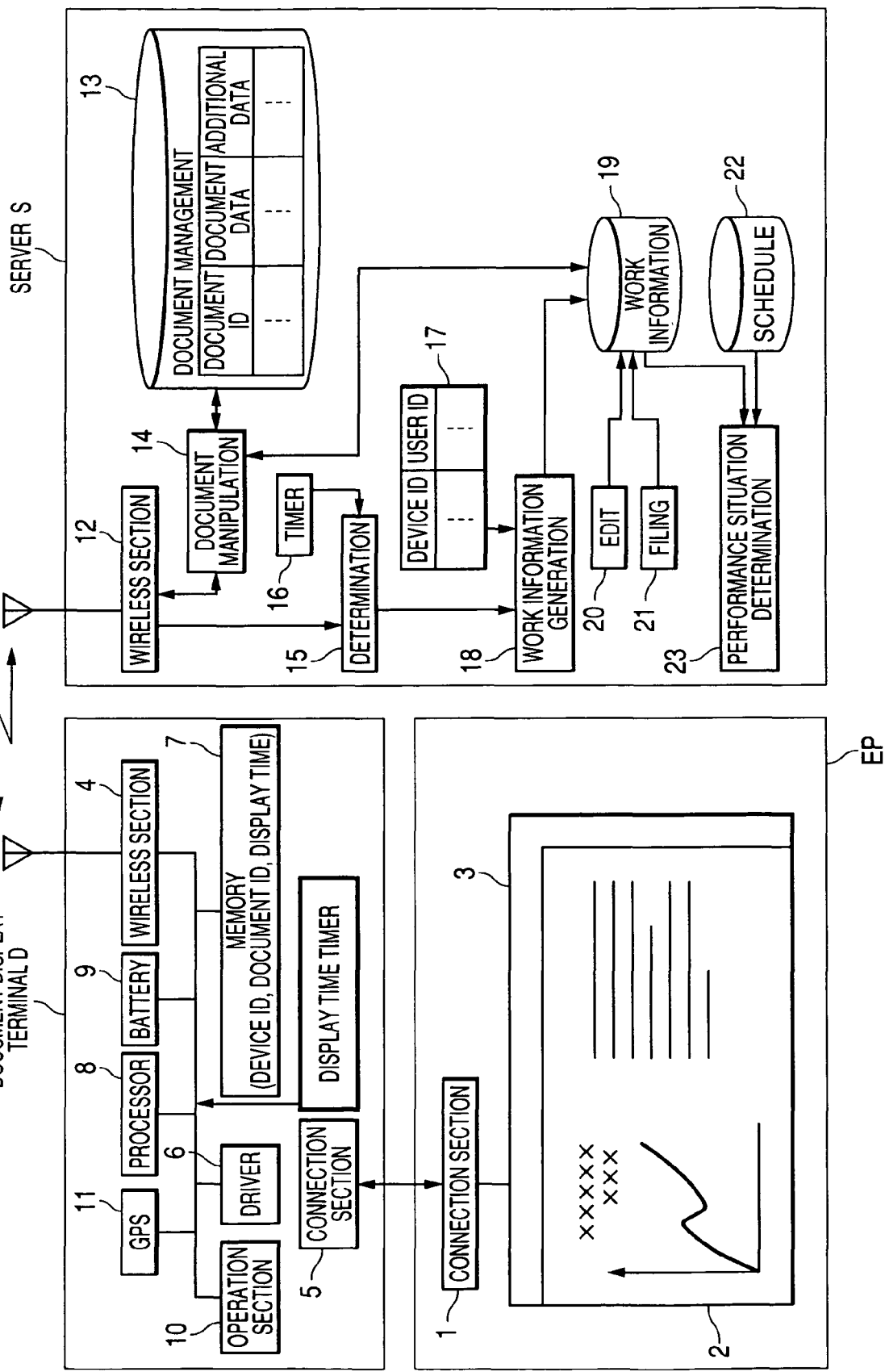
FIG. 2 is a drawing to describe the functions of the work information generation system according to an exemplary embodiment of the invention.

FIG. 2 shows the functional configuration of the server (document management server) S, a document display terminal D, and the electronic paper EP.

The electronic paper EP is made up of a connection section 1 for connecting to the document display terminal D, a display section 2 for holding display of an image, and a drive electrode section 3 for applying a voltage and rewriting the image on the display section 2, and has a function of continuing to hold an image on the display section 2 in a display state if the voltage of the drive electrode section 3 is removed.

The document display terminal D includes a wireless section 4 for conducting wireless communications with the server S, a connection section 5 for connecting to electronic paper EP, a driver 6 for controlling the drive electrode section 3 of the electronic paper EP to rewrite the display section 2, memory 7 for retaining electronic data readably and writably, a processor 8 for performing processing of electronic data, and a battery 9 for supplying operation power to the function section such as the processor 8, and sends a notification to the server S in response to write and display of a document image to and on the display section 2 of the electronic paper EP under the control of the processor 8.

The server S includes a wireless section 4 for conducting wireless communications with each document display terminal D, a document management DB 13 for storing and managing documents, a document manipulation section 14 for accessing the documents in the document management DB 13, a determination section 15 for making a determination to generate work information based on the notification from each document display terminal D, a timer 16 for giving time information to the determination section 15, a device management table 17 for managing the relationship between each document display terminal and the user, a work information generation section 18 for generating work information, and a work information DB 19 for recording and retaining the generated work information, and automatically generates work information under a predetermined condition in response to document display produced on each document display terminal D.

The document management DB 13 manages each document ID for identifying each document, the corresponding document data, and additional data (described later) in association with each other. The document manipulation section 14 reads the document data corresponding to the requested document ID and transmits the document data to the document display terminal D. In the exemplary embodiment, the server S includes the document management DB 13, but the system may be configured so that the document management DB 13 is included in another unit as network connection.

To begin with, writing a document image to electronic paper EP in the document display terminal D of the exemplary embodiment will be discussed.

The document display terminal D retains the document data received through the wireless section 4 from the server S in the memory 7 and the processor 8 generates document image data based on the document data retained in the memory 7, drives the driver 6 with electronic paper EP connected to the connection section 5, and controls the drive electrode section 3 of the electronic paper EP in response to the image data for rewriting and displaying a document image to and on the display section 2.

Figure 4:
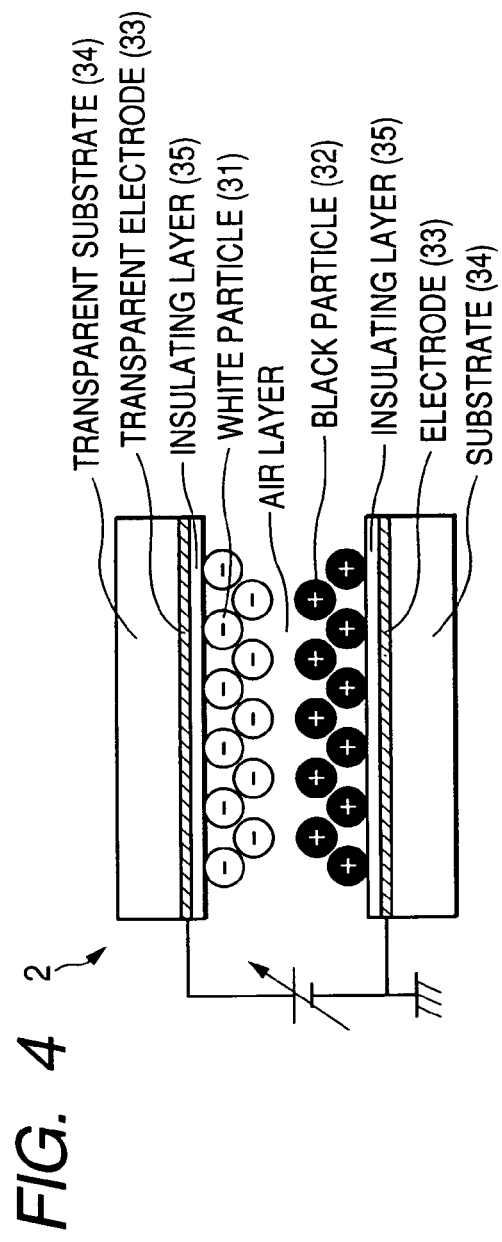
FIG. 4 is a drawing to describe the structure of electronic paper.

The electronic paper EP has a structure wherein fine colored particles used as toner with a copier (in the example shown in the figure, white particles 31 and black particles 32) are filled between a pair of surface and back electrodes 33 with at least the surface being transparent and they are sandwiched between a pair of surface and back film substrates 34 with at least the surface being transparent, as shown in FIG. 4 representing the cross-sectional structure of the display section 2. An air layer is provided between the electrode layers 33 so as to allow the colored particles 31 and 32 to move freely, and each matrix-like electrode layer 33 is provided with an insulating layer 35 for preventing the electrode layer from coming in contact with the colored particles 31 and 32. Using a color filter, color display can also be realized as a simple structure.

Figure 3:
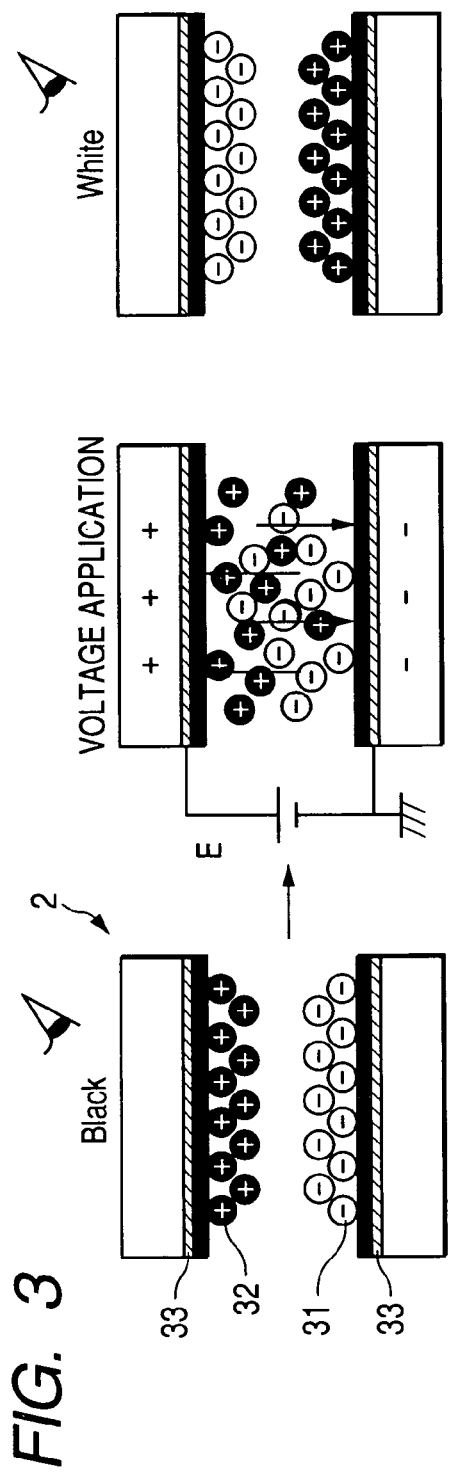
FIG. 3 is a drawing to describe the operation principle of electronic paper.

In the electronic paper EP, the negatively (minus) charged white particles 31 remain on the back and the positively (plus) charged black particles 32 remain on the surface in a state in which no voltage is applied to the electrode 33 (however, the electrode 33 is charged in the polarity at the previous drive time) and if the user visually observes the display section 2 from the surface, the display section 2 is placed in a black state, as shown in FIG. 3 representing the operation principle of the display section 2. When the drive electrode section 3 is controlled by the driver 6 of the document display terminal D based on electronic data and the polarity of the electrode 33 of the required part of the matrix responsive to the image to be displayed is inverted, the positional relationship between the white particles 31 and the black particles 32 is replaced and an image based on the contrast between the white particles 31 and the black particles 32 is displayed on the display section 2. The drive electrode section 3 is operated based on different image data, whereby image information displayed on the display section 2 based on the contrast between the white particles 31 and the black particles 32 can be switched and the electronic paper EP can be reused repeatedly.

Next, work information generation processing performed by the work information generation system of the exemplary embodiment will be discussed.

The memory 7 of the document display terminal D retains not only document data, but also the document ID for identifying the document data and the device ID for identifying the terminal, and the document ID corresponding to the document data used for display is sent to the server S through the wireless section 4 in association with the device ID under the control of the processor 8 in response to writing and display of the document image to and on the display section 2 of the electronic paper EP.

When the server S receives the document ID associated with the device ID from each document display terminal D through the wireless section 12, first the determination section 15 makes a determination to generate work information.

The determination section 15 determines the reception time of the document ID associated with the device ID based on time information given by a reception time determination section such as the timer 16 and determines that a work information generation condition is satisfied when notification of a different device ID is received with respect to the same document within a given time.

If the determination section 15 determines that a work information generation condition is satisfied, the work information generation section 18 generates work information of record of group work accomplished to achieve a common job purpose.

The work information is made up of a plurality of pieces of information as shown in FIG. 5, which are associated with each other by the work information generation section 18 for storage in the work information DB 19.

"Work identification information" is information for identifying the work information and is automatically assigned by the work information generation section 18 so that it is not duplicate with any other work information.

"User identification information" is information for identifying the user participating in the group work; in the exemplary embodiment, the device management table 17 associating the device IDs and the user IDs with each other is referenced based on the device ID sent from each document display terminal D and the user ID of the user owning the document display terminal D producing document display is determined for use as the "user identification information."

"Document identification information" is information for identifying the document used for the group work; in the exemplary embodiment, the document ID sent from each document display terminal D is used.

"Time information" provides the group work execution time; in the exemplary embodiment, the reception time of notification from the document display terminal D is used.

As the work information in FIG. 5, "document manipulation information" involved in document manipulation in the document display terminal D, "location information" indicating the location of the document display terminal D, etc., described later can be further recorded.

Such work information is generated, stored, and managed, whereby the work information can be utilized for various purposes in such a manner that a member having knowledge of one document is found out, that the document used in a meeting in which one member participated in the past is reused for the current meeting, etc., for example.

In the exemplary embodiment, whether or not the work information generation condition is satisfied is determined using the notification reception time, and the work information is generated. However, the work information may be generated based on any other condition.

For example, the document display terminal D detects the display time displaying a document on electronic paper EP and the display time is contained in notification sent to the server S and upon reception of notification of a different device ID relative to the same document ID to which the display time within a given time is added, the determination section 15 determines that the work information generation condition is satisfied. The work information generation section 18 records the document display time in the "time information" of the work information.

For example, the document display terminal D is provided with a location determination section such as a GPS 11 for detecting the location of the home terminal and the detected location data is contained in notification transmitted to the server S and upon reception of notification of a different device ID relative to the same document ID to which the location data within a given range is added, the determination section 15 determines that the work information generation condition is satisfied. The work information generation section 18 records the received location data in the "location information" of the work information.

The document display terminal D is provided with a section for receiving the conference room ID transmitted by a unit installed in each conference room, for example, in place of the GPS 11 described above and the received conference room ID is contained in notification transmitted to the server S and upon reception of notification of a different device ID relative to the same document ID to which the same conference room ID is added, the determination section 15 determines that the work information generation condition is satisfied. The work information generation section 18 records the received conference room ID in the "location information" of the work information.

The time information of the notification reception time, the document display time, etc., and the location information of the location data detected by the GPS 11, the reference room ID, etc., may be used in combination as a work information generation condition and when the condition is satisfied, the work information may be generated.

The information pieces recorded in the work information are not limited to those described above and can be acquired according to various methods.

For example, the user ID may be previously retained in the memory 7 of the document display terminal D or the user may enter the user ID at the starting time of the document display terminal D and the user ID may be sent to the server S for recording the user ID in the "user identification information" of the work information.

For example, electronic paper EP may be provided with a storage section for storing the document ID corresponding to the document image whose display is retained in the electronic paper EP and when the electronic paper EP is connected to the document display terminal D, the document display terminal D may read the document ID from the electronic paper EP and may send the document ID associated with the device ID of the terminal to the server S for recording the document ID in the "document information" of the work information.

That is, as the electronic paper EP displaying a document image is connected to the document display terminal D, it is assumed that a document is displayed, and the work information is generated.

Then, for example, a document image is written to electronic paper EP in one document display terminal D and the document ID corresponding to the document image is recorded and the electronic paper EP is detached and is connected to any other document display terminal D, whereby it is determined that the same document is displayed on both the terminals for sharing the document, and the work information can be generated.

For example, the document display terminal D may be provided with an operation section 10 for accepting manipulation on a document and information involved in the manipulation may be sent to the server S for recording the information in the work information as "document manipulation information."

Figure 7:
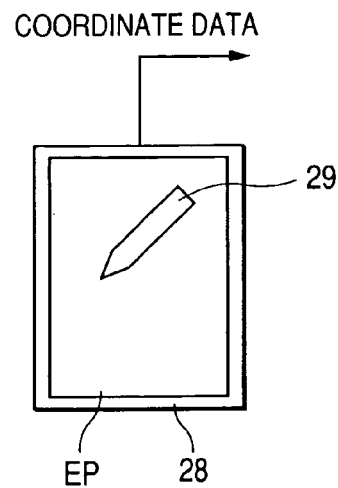
FIG. 7 is a drawing to describe an additional write function to a display document according to an exemplary embodiment of the invention.

That is, for example, as shown in FIG. 7, the document display terminal D is provided with a sheet-like transparent pressure sensitive panel 28 that can be put on the connected electronic paper EP and the operation section 10 is designed for generating additional data based on coordinate data indicating the pressurization locus of a pen 29 detected by the pressure sensitive panel 28 in response to the additional operation of the user using the pen 29 to the display image on the electronic paper EP through the pressure sensitive panel 28 and the additional data is sent to the server S in association with the document ID corresponding to the display image on the electronic paper EP. In the server S, the document manipulation section 14 stored the additional data in the document management DB 13 in association with the document ID and the work information generation section 18 records link information for accessing the additional data, the identification information of the user adding the data, information of the addition operation time, etc., in the "document manipulation information" of the work information.

The additional data thus recorded may be transmitted to the document display terminal D of any other user corresponding to the "user identification information" of the work information for displaying the additional data on electronic paper EP to synchronize one display with another.

The work information generation system of the exemplary embodiment has a management function of generated work information and the server S includes an edit section 20 and a filing section 21 as shown in FIG. 2.

The edit section 20 enables the user to edit the work information stored in the work information DB 19 as rewriting and deletion of the work information. In the exemplary embodiment, the system accepts edit of the work information only by the user corresponding to the "user identification information" of the work information.

The filing section 21 can file the work information stored in the work information DB 19. For example, the user can select the corresponding work information for each job purpose and can arrange the selected work information collectively.

In the work information generation system of the exemplary embodiment, the server S includes a schedule DB 22 for managing job schedules and a performance situation determination section 23 for referencing the work information DB 19 and the schedule DB 22 and determining the job performance situation.

The schedule information managed in the schedule DB 22 is made up of "schedule identification information" for uniquely identifying schedule information, "time information" for recording the scheduled time at which each job will be executed, and "job information" for recording various pieces of information relevant to each job, as shown in FIG. 6. In the "job information" in the exemplary embodiment, the user ID of the user scheduled to execute the job is recorded as "user identification information" and the location data of the scheduled location where the job will be executed is recorded as "location information."

The performance situation determination section 23 acquires the work information in the work information DB 19 and the schedule information in the schedule DB 22 and determines the job performance situation based on the "time information" and the "user identification information" contained therein.

For example, whether or not one scheduled job has been executed, the execution rate of a plurality of jobs scheduled for a common purpose, and the like can be determined. The result may be output in a format easy to judge by the user at a glance, such as a table form or a graph form, for use for job management.

Not only the electronic paper EP used in the work information generation system of the exemplary embodiment, but also electronic paper EP for recording a display image according to any other method. A record method of electronic paper EP of optical write type will be discussed with FIGS. 8 to 10 by way of example.

Figure 8:
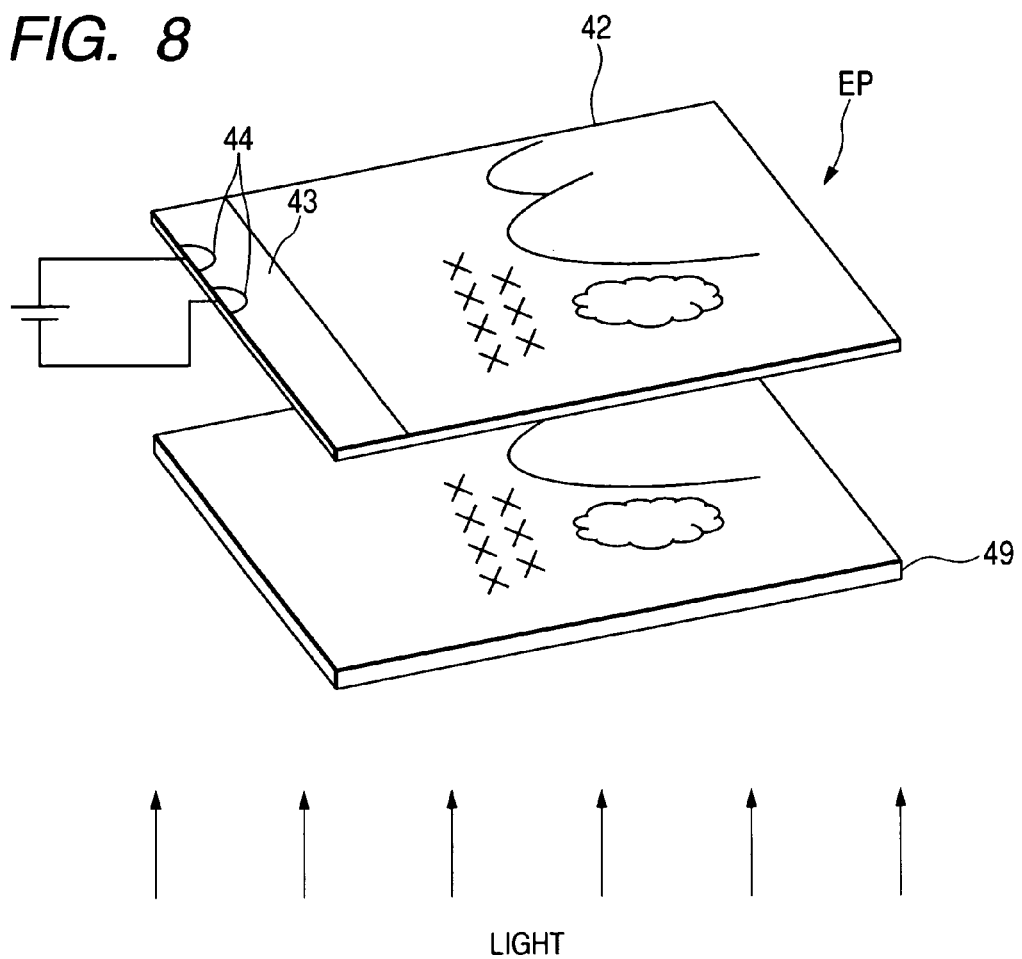
FIG. 8 is a drawing to describe a use method of electronic paper.

As shown in FIG. 8, the optical write type electronic paper EP has a display section 42 for holding display of an image in a no-power supply state and a processing section 43 for performing processing of electronic data, and the processing section 43 is provided with write electrodes 44 for applying a voltage for driving the display section 42 as described later.

Following the optical write type electronic paper EP, a document display terminal D includes a section required for optical write, such as a voltage application section to the electrode 44 and a light application section 49 made of an image write dimming device like a liquid crystal panel or an EL panel.

For example, an image to be written is displayed on the liquid crystal panel 49 and while the voltage from the voltage application section is applied to the electrode 44, the optical write type electronic paper EP is put on the liquid crystal panel 49 and light is applied, whereby the image displayed on the liquid crystal panel 49 can be transferred to the display section 42 for storage. In short, the optical write type electronic paper EP has a function of transferring the projected image to the display section 42 as voltage is applied to the electrode 44 and continuing to hold the image in a display state still after the voltage applied to the electrode 44 is removed.

For example, a printer described in JP-A-2004-106495 can be used as an optical write apparatus to electronic paper in such a manner.

Figure 10:
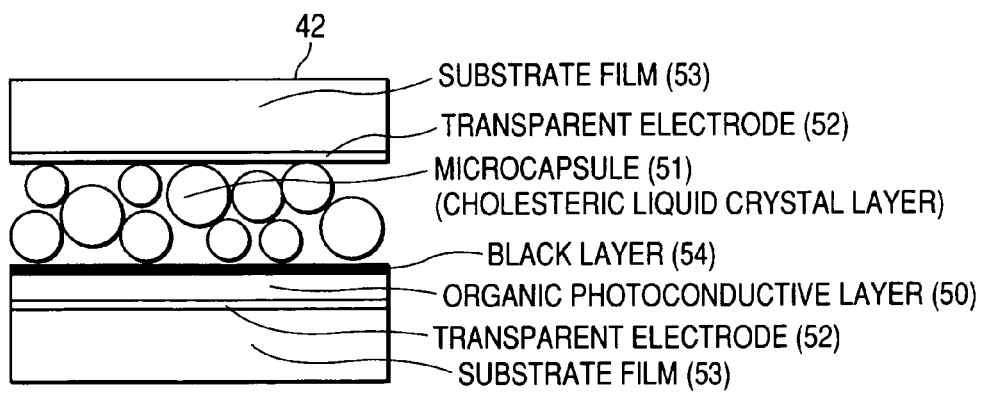
FIG. 10 is a drawing to describe the structure of electronic paper.

The optical write type electronic paper EP has a structure wherein a layer of organic photoconductive material (organic photoconductive layer) 50 used with a copier and a layer of liquid crystal display material (cholesteric liquid crystal layer put into microcapsules) 51 are used in combination and these layers are sandwiched between a pair of surface and back transparent electrodes 52 and the layered body is sandwiched between a pair of surface and back transparent substrate films 53, as shown in FIG. 10 representing the cross-sectional structure of the display section 42. In the structure, monochrome image display can be produced with white display provided by the cholesteric liquid crystal layer 51 reflecting light and black display as light passes through the liquid crystal layer 51 and is absorbed in a black layer 54 provided between the cholesteric liquid crystal layer 51 and the organic photoconductive layer 50. Further, since the cholesteric liquid crystal has a characteristic of interference reflecting of color light responsive to helical pitches, the cholesteric liquid crystal layer 51 is formed by depositing liquid crystal materials different in helical pitch, so that it is also possible to realize color display as a simple structure.

Figure 9:
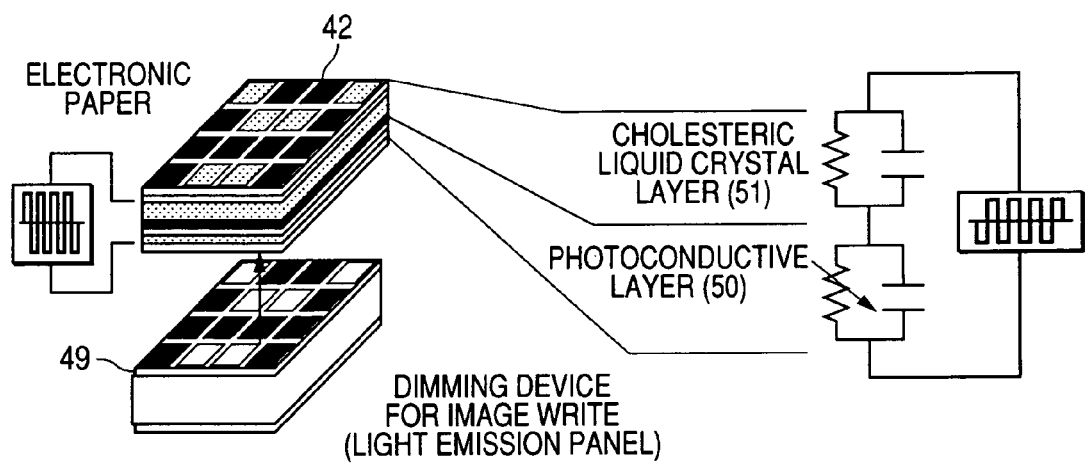
FIG. 9 is a drawing to describe the operation principle of electronic paper.

For example, an image to be transferred to the dimming device panel for image write (light emission panel) 49 is displayed on the optical write type electronic paper EP and is projected on the display section 42 and when a voltage is applied to the electrode 44, intensity of light is converted into the reflection density in a moment and the projection image is retained, as shown in FIG. 9 representing the operation principle of the display section 42. An erasion voltage is applied to the electrode 44, whereby the image information retained in the display section 42 can be erased and the optical write type electronic paper EP can be used repeatedly as write and erasion are repeated.

Without performing such erasion processing for the optical write type electronic paper EP, a voltage is applied to the electrode 44 and a new image is projected as described above, whereby the image information retained in the display section 42 can also be overwritten with new information; the optical write type electronic paper EP can be used repeatedly as such overwrite processing is performed.

The document display terminal D needs only to have the document display function and the function of sending notification of the identification information of the displayed document to the server in association with the identification information given to the home terminal; in addition to use of the document display terminal D and electronic paper EP in combination as described above, the document display terminal D may include a writer to and from which electronic paper can be attached and detached and a control screen for performing information manipulation. Further, a mobile information terminal such as a mobile personal computer or a PDA may be used.

According to an aspect of the invention, there is provided a work information generation system including a plurality of terminals for displaying a document and a server for conducting communications with the terminals, wherein each of the terminals is responsive to display of a document for sending notification of identification information given to the home terminal and identification information of the document in association with each other to the server by notification section, and wherein the server determines that the same document is displayed satisfying a predetermined condition at a plurality of terminals based on the notification received from each terminal by determination section, is responsive to the determination for generating work information containing the identification information of the document, the identification information given to each of the terminals displaying the document, and information relating to the predetermined condition in association with each other by work information generation section, and records and retains the generated work information by work information retention section.

That is, an aspect of the invention is intended for generating record of group work accomplished to achieve a common job purpose as work information and automatically generates work information with display of the same document satisfying a predetermined condition at a plurality of terminals as a trigger, so that the user need not previously register the schedule of group work such as a conference or a meeting.

The work information contains the document identification information (document ID, URL, etc.,) and the identification information given to the terminal (device ID, user ID, etc.,) associated with each other, so that the work information can be utilized for various purposes in such a manner that a member having knowledge of one document is found out, that the document used in a meeting in which one member participated in the past is reused for the current meeting, etc., for example.

As the predetermined condition, a time condition and a location condition can be named, for example.

The time condition is the reception time of notification received by the server from each terminal, for example. That is, the server includes reception time determination section for determining the reception time of the notification received from each terminal, and the determination section of the server determines reception of notification of display of the same document from a plurality of terminals within a given time.

The time condition is the document display time at each terminal, for example. That is, each terminal includes display time determination section for determining the document display time and causing the notification section to send notification of the document display time to the server, and the determination section of the server determines display of the same document within a given time at a plurality of terminals.

A display time timer contained in the inside of the document display terminal D can be used as the display time determination section. Specifically, the display time timer is a timer that generates time information in conjunction with the processing of the processor of the document display terminal D. Time information is generated in a predetermined time format, and the generation is coincident with the output timing of a driving signal etc. which the processor send to the driver of the electronic paper EP. The generated time information is stored on the memory in the document display terminal D along with the device ID and the document ID. The server reads the display time information contained in the information sent from the document display terminal D, and determines based on the information whether or not a plurality of terminals display the same document within a given time. In this case, the timer 16 in the server does not relate to the determination.

The location condition is location information of each terminal, for example. That is, each terminal includes location determination section for acquiring location information of the home terminal and causing the notification section to send notification of the location information to the server, and the determination section of the server determines display of the same document at a plurality of terminals positioned at locations within a given range.

The notification reception time or the document display time and the terminal location information used as the predetermined condition is associated with the document identification information and the identification information given to each terminal displaying the document according to the work information and thus can be used to determine any desired work information to later reuse the work information, Each terminal may include manipulation acceptance section for accepting manipulation on a document and causing the notification section to send notification of information involved in the manipulation to the server, and the work information generation section of the server may generate the work information by associating the information involved in the manipulation with the identification information of the document. At the time, the information is transmitted to any other terminal associated according to the work information for rewriting display at each terminal, whereby one display can be synchronized with another.

The identification information given to each terminal may be identification information of the user of the terminal (user ID) and the work information generation system may further include a schedule management unit for managing schedule information containing a job, the execution scheduled time of the job, and identification information of the execution scheduled user of the job in association with each other and the server may include performance situation determination section for determining the job performance situation based on the time and the user identification information contained in the work information and the schedule information, so that it is made possible for the job manager to determine whether or not the job is performed as scheduled.

For example, the job performance situation may be put into an image for output in a table form or a graph form in response to the determination result.

The invention can be embodied in various forms of not only the work information generation system and a method executed by the system, but also a terminal forming a part of the system, a server forming a part of the system, and a program for implementing the server as a computer.

Each terminal needs only to be able to display a document and send notification of the identification information of the displayed document to the server in association with the identification information given to the home terminal. For example, a mobile information terminal such as a mobile personal computer or a PDA cab be used.

An electronic paper access unit including connection section for connecting electronic paper having a display section for holding display of a document image in a no-power supply state; and write section for displaying a document image on the connected electronic paper may be used as the terminal. Notification of the identification information given to the home terminal and the identification information of the document in association with each other may be sent to the server in response to display of a document image on the connected electronic paper by the write section.

An electronic paper access unit including connection section for connecting electronic paper having a display section for holding display of a document image in a no-power supply state and a storage section for storing identification information of the document; and read section for reading the identification information of the document from the connected electronic paper may be used as the terminal. Notification of the identification information given to the home terminal and the identification information of the document read from the electronic paper in association with each other may be sent to the server in response to connection of electronic paper.

The notification section of each terminal may be implemented using RFID for conducting passive communications using the received radio wave from each reader as drive power in addition to sending notification using the wired or wireless communication function of each terminal.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A work information generation system comprising:
a plurality of terminals that display a document; and
a server that conducts communications with the plurality of terminals,
wherein each of the plurality of terminals comprises a notification section that sends notification of identification information given to each of the plurality of terminals and identification information of a document in association with each other to the server after the document has been displayed at each of the plurality of terminals, wherein the identification information given to each of the plurality of terminals is a device ID, and wherein the server comprises:

a determination section that determines whether or not the same document has been displayed with a predetermined condition at the plurality of terminals based on the notifications received from each of the plurality of terminals;

a reception time determination section that determines a reception time of the notification received from each of the plurality of terminals;

a work information generation section that generates work information containing the identification information of the document, the identification information given to each of the plurality of terminals displaying the document and information relating to the predetermined condition in association with each other after determining that the same document has been displayed satisfying the predetermined condition at the plurality of terminals; and a work information retention section that records and retains the generated work information, wherein the predetermined condition includes the reception time of the notification determined by the reception time determination section, and wherein the determination section determines whether or not the notifications have been received from the plurality of terminals within a given time using the reception time, said notification indicating that the same document has been displayed at the plurality of terminals.

2. The work information generation system according to claim 1, wherein each of the plurality of terminals further comprises a manipulation acceptance section that accepts manipulation on the document and causes the notification section to send notification of information involved in the manipulation, and wherein the work information generation section generates work information by associating the information involved in the manipulation with the identification information of the document.

3. The work information generation system according to claim 1, wherein the identification information given to each of the plurality of terminals is identification information of a user of each of the plurality of terminals, the work information generation system further comprising:

a schedule management unit that manages schedule information containing a job, an execution scheduled time of the job and identification information of an execution scheduled user of the job in association with each other, wherein the server further comprises a performance situation determination section that determines a job performance situation based on the time and the user identification information contained in the work information and the schedule information.

4. A server for receiving notification from a plurality of terminals after a document has been displayed at each of the plurality of terminals and performing work information generation processing, the server comprising:

a determination section that determines whether or not the same document has been displayed with a predetermined condition at the plurality of terminals based on notifications received from each of the plurality of terminals, wherein the notification contains identification information given to each of the plurality of terminals and identification information of the document displayed at each of the plurality of terminals in association with each other, and wherein the identification information given to each of the plurality of terminals is a device ID;

a work information generation section that generates work information containing the identification information of the document, the identification information given to each of the plurality of terminals displaying the document and information relating to the predetermined condition in association with each other after determining that the same document has been displayed satisfying the predetermined condition at the plurality of terminals;

a work information retention section that records and retains the generated work information; and a reception time determination section that determines a reception time of the notification received from each of the plurality of terminals, wherein the predetermined condition includes the reception time of the notification determined by the reception time determination section, and wherein the determination section determines whether or not the notifications have been received from the plurality of terminals within a given time using the reception time, said notification indicating that the same document has been displayed at the plurality of terminals.

5. A terminal for sending notification to a server after a document has been displayed at the terminal, the terminal comprising:

a notification section that sends notification of identification information given to the terminal and identification information of the document in association with each other to the server after the document has been displayed at the terminal, in order for the server to generate, record and retain work information containing the identification information of the document, the identification information given to each of a plurality of terminals displaying the document and information relating to a predetermined condition in association with each other based on display of the same document satisfying the predetermined condition at the plurality of terminals, wherein the identification information given to each of the plurality of terminals is a device ID, wherein each of the plurality of terminals further comprises a display time determination section that determines a document display time and causes the notification section to send notification of the document display time, wherein the predetermined condition includes the document display time of the plurality of terminals determined by the display time determination section, and wherein the determination section determines whether or not the same document has been displayed within a given time at the plurality of terminals using the document display time.

6. The terminal according to claim 5, further comprising:

a connection section that connects an electronic paper having a display section for holding display of a document image in a no-power supply state; and a write section that displays a document image on the connected electronic paper, wherein the notification section sends notification of the identification information given to the terminal and the identification information of the document in association with each other to the server in response to display of the document image on the connected electronic paper by the write section.

7. The terminal according to claim 5, further comprising:
a connection section that connects an electronic paper having a display section for holding display of a document image in a no-power supply state and a storage section for storing the identification information of the document; and
a read section that reads the identification information of the document from the connected electronic paper,
wherein the notification section sends notification of the identification information given to the terminal and the identification information of the document read from the electronic paper in association with each other to the server in response to connection of the electronic paper.

8. A non-transitory computer readable medium storing a program causing a computer to execute a process for receiving notification from a plurality of terminals after a document has been displayed at the plurality of terminals and performing work information generation processing, the process comprising:
determining whether or not the same document has been displayed with a predetermined condition at the plurality of terminals based on notifications received from each of the plurality of terminals, wherein the notification contains identification information given to each of the plurality of terminals and identification information of the document displayed at each of the plurality of terminals in association with each other and wherein the identification information given to each of the plurality of terminals is a device ID;
generating work information containing the identification information of the document, the identification information given to each of the plurality of terminals displaying the document and information relating to the predetermined condition in association with each other after determining that the same document has been displayed satisfying the predetermined condition at the plurality of terminals;
determining a reception time of the notifications received from each of the plurality of terminals; determining whether or not the notifications have been received from the plurality of terminals within a given time using the reception time, said notification indicating that the same document has been displayed at the plurality of terminals; and
recording and retaining the generated work information,
wherein the predetermined condition includes the reception time of the notification.

9. The process of claim 8, further comprising:
acquiring physical location information of each of the plurality of terminals and sending notification of the physical location information; and
determining whether or not the same document is displayed at the plurality of terminals positioned at locations within a given range using the physical location information, the physical location information being determined based on a detection of a conference room ID,
wherein the predetermined condition includes the physical location information of the plurality of terminals.

10. A work information generation method executed by a plurality of terminals for displaying a document and a server for conducting communications with the plurality of terminals, the method comprising:
sending notification of identification information given to each of the plurality of terminals and identification information of the document in association with each other to the server after the document has been displayed at each of the plurality of terminals, wherein the identification information given to each of the plurality of terminals is a device ID;
determining whether or not the same document has been displayed with a predetermined condition at the plurality of terminals based on the notifications received from each of the plurality of terminals;
generating work information containing the identification information of the document, the identification information given to each of the plurality of terminals displaying the document and information relating to the predetermined condition in association with each other after determining that the same document has been displayed satisfying the predetermined condition at the plurality of terminals;
determining a reception time of the notification received from each of the plurality of terminals,
determining whether or not the notifications have been received from the plurality of terminals within a given time using the reception time, said notification indicating that the same document has been displayed at the plurality of terminals; and
recording and retaining the generated work information,
wherein the predetermined condition includes the reception time of the notification.

11. The method of claim 10, further comprising:
acquiring physical location information of each of the plurality of terminals and sending notification of the physical location information; and
determining whether or not the same document is displayed at the plurality of terminals positioned at locations within a given range using the physical location information, the physical location information being determined based on a detection of a conference room ID,
wherein the predetermined condition includes the physical location information of the plurality of terminals.

12. A work information generation system comprising:
a plurality of terminals that display a document; and
a server that conducts communications with the plurality of terminals,
wherein each of the plurality of terminals comprises a notification section that sends notification of identification information given to each of the plurality of terminals, identification information of a document in association with each other to the server after the document has been displayed at each of the plurality of terminals, and a display time determination section that determines a document display time and causes the notification section to send notification of the document display time,
wherein the identification information given to each of the plurality of terminals is a device ID, and
wherein the server comprises:
a determination section that determines whether or not the same document has been displayed with a predetermined condition at the plurality of terminals based on the notifications received from each of the plurality of terminals;
a work information generation section that generates work information containing the identification information of the document, the identification information given to each of the plurality of terminals displaying the document and information relating to the predetermined condition in association with each other after determining that the same document has been displayed satisfying the predetermined condition at the plurality of terminals; and a work information retention section that records and retains the generated work information, wherein the predetermined condition includes the document display time of the plurality of terminals determined by the display time determination section, and wherein the determination section determines whether or not the same document has been displayed within a given time at the plurality of terminals using the document display time.

13. The work information generation system according to claim 12, wherein the identification information given to each of the plurality of terminals is identification information of a user of each of the plurality of terminals, the work information generation system further comprising:

a schedule management unit that manages schedule information containing a job, an execution scheduled time of the job and identification information of an execution scheduled user of the job in association with each other, wherein the server further comprises a performance situation determination section that determines a job performance situation based on the time and the user identification information contained in the work information and the schedule information.

14. The work information generation system according to claim 12, wherein each of the plurality of terminals further comprises a manipulation acceptance section that accepts manipulation on the document and causes the notification section to send notification of information involved in the manipulation, and wherein the work information generation section generates work information by associating the information involved in the manipulation with the identification information of the document.

15. A work information generation system comprising:

a plurality of terminals that display a document; and a server that conducts communications with the plurality of terminals, wherein each of the plurality of terminals comprises a notification section that sends notification of identification information given to each of the plurality of terminals, identification information of a document in association with each other to the server after the document has been displayed at each of the plurality of terminals, and a location determination section that acquires physical location information of each of the plurality of terminals and causes the notification section to send notification of the physical location information, wherein the identification information given to each of the plurality of terminals is a device ID, and wherein the server comprises:

a determination section that determines whether or not the same document has been displayed with a predetermined condition at the plurality of terminals based on the notifications received from each of the plurality of terminals;

a work information generation section that generates work information containing the identification information of the document, the identification information given to each of the plurality of terminals displaying the document and information relating to the predetermined condition in association with each other after determining that the same document has been displayed satisfying the predetermined condition at the plurality of terminals; and a work information retention section that records and retains the generated work information, wherein the predetermined condition includes the physical location information of the plurality of terminals determined by the location determination section, and wherein the determination section determines whether or not the same document has been displayed at the plurality of terminals positioned at locations within a given range using the physical location information.

16. The work information generation system according to claim 15, wherein each of the plurality of terminals further comprises a manipulation acceptance section that accepts manipulation on the document and causes the notification section to send notification of information involved in the manipulation, and wherein the work information generation section generates work information by associating the information involved in the manipulation with the identification information of the document.

17. The work information generation system of claim 15, wherein the physical location information is determined based on a detection by the location determination section of a conference room ID.

18. The work information generation system of claim 15, wherein the location determination section includes a GPS and the physical location information is determined based on a GPS signal.

19. A server for receiving notification from a plurality of terminals after a document has been displayed at each of the plurality of terminals and performing work information generation processing, the server comprising:

a determination section that determines whether or not the same document has been displayed with a predetermined condition at the plurality of terminals based on notifications received from each of the plurality of terminals, wherein the notification contains identification information given to each of the plurality of terminals and identification information of the document displayed at each of the plurality of terminals in association with each other, and wherein the identification information given to each of the plurality of terminals is a device ID;

a work information generation section that generates work information containing the identification information of the document, the identification information given to each of the plurality of terminals displaying the document and information relating to the predetermined condition in association with each other after determining that the same document has been displayed satisfying the predetermined condition at the plurality of terminals; and a work information retention section that records and retains the generated work information, wherein each of the plurality of terminals further comprises a location determination section that acquires physical location information of each of the plurality of terminals and causes the notification section to send notification of the physical location information, wherein the predetermined condition includes the physical location information of the plurality of terminals determined by the location determination section, and wherein the determination section determines whether or not the same document has been displayed at the plurality of terminals positioned at locations within a given range using the physical location information.

20. The server of claim 19, wherein the physical location information is determined based on a detection by the location determination section of a conference room ID.

21. The server of claim 19, wherein the location determination section includes a GPS and the physical location information is determined based on a GPS signal.

22. A terminal for sending notification to a server after a document has been displayed at the terminal, the terminal comprising:
    a notification section that sends notification of identification information given to the terminal and identification information of the document in association with each other to the server after the document has been displayed at the terminal, in order for the server to generate, record and retain work information containing the identification information of the document, the identification information given to each of a plurality of terminals displaying the document and information relating to a predetermined condition in association with each other based on display of the same document satisfying the predetermined condition at the plurality of terminals, wherein the identification information given to each of the plurality of terminals is a device ID,
    wherein each of the plurality of terminals further comprises a location determination section that acquires physical location information of each of the plurality of terminals and causes the notification section to send notification of the physical location information,
    wherein the predetermined condition includes the physical location information of the plurality of terminals determined by the location determination section, and
    wherein the determination section determines whether or not the same document has been displayed at the plurality of terminals positioned at locations within a given range using the physical location information.

23. The terminal of claim 22, wherein the physical location information is determined based on a detection by the location determination section of a conference room ID.

24. The terminal of claim 22, wherein the location determination section includes a GPS and the physical location information is determined based on a GPS signal.

25. A non-transitory computer readable medium storing a program causing a computer to execute a process for receiving notification from a plurality of terminals after a document has been displayed at each of the plurality of terminals and performing work information generation processing, the process comprising:
    determining whether or not the same document has been displayed with a predetermined condition at the plurality of terminals based on notifications received from each of the plurality of terminals, wherein the notification contains identification information given to each of the plurality of terminals and identification information of the document displayed at each of the plurality of terminals in association with each other and wherein the identification information given to each of the plurality of terminals is a device ID;
    generating work information containing the identification information of the document, the identification information given to each of the plurality of terminals displaying the document and information relating to the predetermined condition in association with each other after determining that the same document has been displayed satisfying the predetermined condition at the plurality of terminals;
    determining a document display time and sending notification of the document display time;
    determining whether or not the same document has been displayed within a given time at the plurality of terminals using the document display time; and
    recording and retaining the generated work information,
    wherein the predetermined condition includes the document display time of the plurality of terminals.

26. The process of claim 25, further comprising:
    acquiring physical location information of each of the plurality of terminals and sending notification of the physical location information; and
    determining whether or not the same document is displayed at the plurality of terminals positioned at locations within a given range using the physical location information, the physical location information being determined based on a detection of a conference room ID,
    wherein the predetermined condition includes the physical location information of the plurality of terminals.

27. A work information generation method executed by a plurality of terminals for displaying a document and a server for conducting communications with the plurality of terminals, the method comprising:
    sending notification of identification information given to each of the plurality of terminals and identification information of the document in association with each other to the server after the document has been displayed at each of the plurality of terminals, wherein the identification information given to each of the plurality of terminals is a device ID;
    determining whether or not the same document has been displayed with a predetermined condition at the plurality of terminals based on the notifications received from each of the plurality of terminals;
    generating work information containing the identification information of the document, the identification information given to each of the plurality of terminals displaying the document and information relating to the predetermined condition in association with each other after determining that the same document has been displayed satisfying the predetermined condition at the plurality of terminals;
    determining a document display time and sending notification of the document display time;
    determining whether or not the same document has been displayed within a given time at the plurality of terminals using the document display time; and
    recording and retaining the generated work information,
    wherein the predetermined condition includes the document display time of the plurality of terminals.

28. The method of claim 27, further comprising:
    acquiring physical location information of each of the plurality of terminals and sending notification of the physical location information; and
    determining whether or not the same document is displayed at the plurality of terminals positioned at locations within a given range using the physical location information, the physical location information being determined based on a detection of a conference room ID,
    wherein the predetermined condition includes the physical location information of the plurality of terminals.

* * * * *